Patented Dec. 11, 1951

2,578,063

UNITED STATES PATENT OFFICE 2,578,063

PROCESS OF REACTING RUBBERS WITH SULFUR DIOXIDE

Johannes Thomas Hackmann, Amsterdam, Netherlands, assignor to Shell Development Company, San Francisco, Calif., a corporation of Delaware No Drawing. Application June 15, 1948, Serial No. 33,229. In the Netherlands July 17, 1947

6 Claims. (Cl. 18—54)

This invention relates to a process by which high molecular weight, polyunsaturated compounds, or mixtures of such compounds with unsaturated compounds of low molecular weight, are reacted with sulfur dioxide to form useful reaction products, but particularly threads and other filament-like shapes, the invention being more specifically directed to the manner in which said sulfur dioxide is supplied to the reaction zone.

The term "high molecular weight, polyunsaturated compounds," as employed herein, embraces those compounds having a molecular weight of at least 5,000 which contain a plurality of unsaturated linkages in the molecule. These compounds are either polymers of organic compounds containing a plurality of unsaturated linkages in the molecule, or are copolymers of such multiple-unsaturated compounds with other unsaturated organic compounds of one type or another. The term includes the various natural rubbers such as latex, crepe, sheet, caoutchouc, gutta percha, balata, and cyclo rubbers, as well as unsaturated synthetic rubbers. Representative synthetic polymers of high molecular weight are the polymerization products of butadiene and those of its homologues and derivatives, as, for example, methyl butadiene polymers, dimethyl butadiene polymers, pentadiene polymers, and chloroprene polymers (neoprene synthetic rubber). Other high molecular weight polymers are those formed from acetylene hydrocarbons and their derivatives, as monovinyl acetylene polymer and divinyl acetylene polymer. Representative copolymers of high molecular weight which come within the term are those formed from butadiene, its homologues and derivatives, and from acetylene hydrocarbons and their derivatives, either in admixture (as the synthetic rubber Buna N, a copolymer of butadiene and acrylonitrile) or with other unsaturated organic compounds. Among the latter are the olefins, as isobutylene which copolymerizes with butadiene to form butyl synthetic rubber; the vinyls, as vinyl chloride, acrylic acid, methacrylic acid, and styrene, the latter compound copolymerizing with butadiene to form the synthetic rubber Buna S; as well as the vinyl esters and various unsaturated aldehydes, ketones and ethers, as acrolein, methyl isopropenyl ketone, and vinyl ethyl ether.

The above-defined, polyunsaturated, high molecular weight materials may also properly be termed "high molecular weight polymers of diene-hydrocarbons." Alternatively, these high molecular weight polyunsaturated materials, including both natural as well as synthetic rubbers, may be defined as "rubbery polymers of at least one compound selected from the group consisting of the conjugated diolefins and chloroprene."

Among the polyunsaturated high molecular weight compounds, those which find preferred usage in the practice of this invention are the rubbers, particularly the natural rubbers and those synthetic rubbers comprised in whole or part of butadiene polymers or copolymers.

The term "low molecular weight unsaturated compounds" is employed herein to designate those compounds which contain aliphatic unsaturation between one or more pairs of adjacent carbon atoms, and which have a molecular weight of below 5,000 and which generally does not exceed 1,000. Included within this term are the various olefins, diolefins and acetylenes, as well as those compounds of this type which are substituted by one or more polar groups. Representative polar substituents are the halogens and the OH, $NH_2$, NH, $NCONH_2$, $NCSNH_2$, $SC(NH_2)_2$, NCO, NCS, SCN, NSO, OOC (alkyl or aryl) and O(alkyl or aryl) groups. Illustrative examples of unsubstituted, low molecular weight unsaturated compounds are 1-butene, 2-butene, 1-pentene, 1-hexene, 1-heptene, 1-dodecene, 1-tetradecene, cyclopentene, cyclohexene, 1,3-butadiene, 1,3-pentadiene, 1,5-hexadiene (diallyl), 2-methyl-1,3-butadiene (isoprene), diisobutenyl, 1-butyne, divinyl acetylene, and the like. Representative substituted, low molecular weight unsaturated compounds are allyl alcohol, crotyl alcohol, 1,5-hexadiene-3-ol, propargyl alcohol, allyl chloride, 2-chloro-1,3-butadiene, allyl amine, 5-dimethylamino-1-pentene, allyl isocyanate, N-allyl-N'-phenolthiourea, N-allyl thiourea, S-allyl-N,N'-diphenylisothiourea, allyl isothiocyanate, allyl thiocyanate, thionyl allylamine, allyl acetate, allyl capronate, allyl oleate, diallyl phthalate, diallyl adipate, dipropenyl glutarate, dipropenyl phthalate, diallyl sebacate, diallyl malonate, allyl ethyl ether, and diallyl ether. Among the low molecular weight unsaturated compounds, a preferred group for the purposes of this invention is that made up of the various olefinic hydrocarbons, halides, acohols and esters. A still more preferred class of low molecular weight compounds is made up of the allyl halides, alcohols, and esters.

Many of the low molecular weight unsaturated compounds mentioned above are capable of ready polymerization and frequently are available only in the polymerized or partially polymerized condition. Accordingly, the term "low molecular weight unsaturated compounds" is also meant to include not only the unsaturated monomers, but also those unsaturated polymers and part polymers thereof whose molecular weight is less than 5,000.

It is known that the high molecular weight polyunsaturated compounds lend themselves well to the production of various shapes, including those of a continuous, non-supported nature, as filaments, rods, strips, sheets, and the like. Processes of this nature are set forth in detail, for example, in U. S. Patents No. 2,185,656, issued January 2, 1940, No. 2,198,927, issued April 20, 1940, and No. 2,288,982, issued July 7, 1942, and reference is hereby made to the said patents for a more complete disclosure of the methods there described. Furthermore, it is known that the properties of such shapes may be improved by reacting the unsaturated, high molecular weight compound with one or more of the inorganic acidifying compounds, but particularly with sulfur dioxide. The exact nature of the reaction between the unsaturated reactant and sulfur dioxide is not clearly understood, though it is evident that a quantity of the latter compound is taken up in one form or another by the high molecular weight reactant. The extent of the reaction is normally measured by, and expressed in terms of, the amount of sulfur present in the resulting reaction product. Whatever its nature, the reaction is an extremely slow one under normal conditions, and if materials of high purity be used, substantially no reaction at all occurs in most instances.

From co-pending application, Serial No. 15,048 filed March 15, 1948, to which reference is here made for a more complete description of the process and products there disclosed, it is also known to react sulfur dioxide with mixtures containing a polyunsaturated, high molecular weight compound as well as an unsaturated compound of low molecular weight, it being disclosed in said application that improved dye acceptance and other beneficial qualities are achieved by utilizing both types of unsaturated reactants in forming the final reaction product.

In making filaments or other continuous shapes of such reaction products, the conventional practice is to spin or otherwise inject a solution of the unsaturated reactant(s) into a coagulating bath in which the sulfur dioxide is dissolved, an ethanol-water solvent being that customarily employed. The injected material reacts with the sulfur dioxide present in solution to form an insoluble reaction product which is continuously withdrawn from the bath. In forming shapes in this manner it is of the greatest importance that the reaction proceed as rapidly as possible inasmuch as the injected material normally remains in the bath for but a fraction of a second. Further, it is also of importance that the reaction be as complete as possible, i. e., that the unsaturated compounds react with and retain the greatest possible amount of sulfur dioxide. One method for accelerating this reaction is disclosed in U. S. Patent No. 2,265,722, issued December 9, 1941, and comprises conducting the reaction in the presence of aliphatic, cyclic, or aliphatic-cyclic compounds containing ether-like oxygen atoms, as diethyl ether, diisopropyl ether, vinyl ethyl ether, pentamethylene oxide, methyl propane methylene dioxide, ethene methylene dioxide, paraldehyde, dioxane or diethyl acetal. Reference is hereby made to said patent for a more complete description of the procedure there disclosed. Again, in U. S. Patent No. 2,469,847, issued May 10, 1949, and in copending application Serial No. 788,312, filed November 26, 1947, now Patent No. 2,558,498, the disclosure is made that by treating the polyunsaturated, high molecular weight reactant with a hydroperoxide, said reactant is so activated as to become particularly reactive towards the sulfur dioxide. The peroxide treatment is also disclosed in co-pending application Serial No. 15,048 referred to above, as said activation treatment relates to mixtures of high and low molecular weight unsaturated reactants.

In addition to modifying the unsaturated reactants, as by the foregoing peroxide treatment or otherwise, attempts have also been made to expedite the reaction through increasing the sulfur dioxide concentration of the coagulating bath. However, the only practical method developed for increasing the sulfur dioxide concentration has been to refrigerate the bath. Thus, ethanol-water systems maintained at from $-10°$ C. to $0°$ C. will dissolve as much as 25 to 35% by weight sulfur dioxide, whereas much lesser amounts can be dissolved at temperatures of $10°$ C. and above. On the other hand, it is difficult to work with fully saturated solutions since they tend to evolve relatively large amounts of sulfur dioxide in gaseous form and therefore constitute an obvious hazard. Further, it has been observed that as the sulfur dioxide concentration in the coagulating bath is increased, the very purpose of such increase is often defeated, a result believed attributable to the known deactivating action of sulfur dioxide on high molecular weight polyunsaturated compounds, as well as on unsaturated compounds of low molecular weight, which have been previously activated by the addition of a peroxide. The deactivation, unless compensated by a corresponding increase in the amount of activating agent originally employed, is manifested in a variety of ways, sometimes leading to a decrease in the extent of the reaction and in others to an uneven reaction throughout the body of the precipitated reaction product. Even in those cases where the intended purposes may be achieved through use of refrigerated coagulation baths of the ethanol-water type, it has been realized that the fullest possible reaction between the sulfur dioxide and the unsaturated reactant present was still not being achieved. Accordingly, the method of increasing the possible sulfur dioxide concentration by refrigerating the coagulating bath and saturating the same with sulfur dioxide not only has presented the difficulties and added expense of both refrigerating the solution as well as protecting workmen from escaping sulfur dioxide fumes, but it in many cases has altogether failed of its intended purpose of accelerating the reaction, as well.

It is therefore a general object of this invention to provide a method of reacting high molecular weight, polyunsaturated compounds, in either the presence or absence of an added low molecular weight, unsaturated compound, with sulfur dioxide under such circumstances that the fullest possible reaction is obtained while at the same time utilizing a relatively short reaction interval.

A further object is to accomplish the foregoing reaction without resort to the use of abnormally low temperatures in the sulfur dioxide-containing coagulating bath.

Another object is to provide a method whereby the coagulating bath may contain amounts of sulfur dioxide materially larger than have hitherto been obtainable even by refrigeration, yet from which substantially no sulfur dioxide vapors escape.

A further object is to provide a method whereby the desired reaction is completed before any substantial deactivation by sulfur dioxide of the previously activated unsaturated reactant may occur, thereby permitting the use of lower amounts of peroxide or other activating agents for the unsaturated reactant that might otherwise be employed.

Another object is to provide a method whereby the foregoing objects may be achieved while using the same solvent for the unsaturated reactant or reactants, and for the sulfur dioxide.

Still another object is to provide a method of producing thread-like filaments of high tensile strength which are flexible, resilient, and generally satisfactory for textile purposes.

It has been discovered that the foregoing objects are achieved by employing as the coagulating bath the loose molecular combination or adduct formed between sulfur dioxide and a lower aliphatic ketone. Such adducts are readily formed by passing sulfur dioxide into the liquid ketone, and since the reactants combine in equimolar proportions, the resulting liquids are high in sulfur dioxide (52.5% in the case of acetone). While such adducts resist decomposition at temperatures up to 20° C. and even higher and suffer practically no discharge of vaporous sulfur dioxide, nevertheless all the sulfur dioxide present is freely available for reaction with the unsaturated compounds, as rubbers, which may be introduced into the bath. Furthermore, since these adducts themselves act as solvents for sulfur dioxide, the content of the latter compound in the coagulating bath may be even further increased through the solution therein of additional quantities of sulfur dioxide. However, this practice has the disadvantage that loss of sulfur dioxide in the vapor form is thereby increased.

The lower aliphatic ketones which are useful in the practice of the present invention are those which contain from 3 to 10 carbon atoms. Illustrative ketones falling within this class, all of which combine with sulfur dioxide to provide a liquid coagulate medium at temperatures between 0 and 20° C., are acetone, 2-butanone, 3-methyl-2-butanone, 2-pentanone, 3-pentanone, 4-methyl-2-pentanone, 2,4-dimethyl-3-pentanone, 2-hexanone, 3-hexanone, 5-methyl-3-hexanone, 2-heptanone, 3-heptanone, 2,6-dimethyl-4-heptanone, 2-octanone, 3-octanone, 3-nonanone, 5-nonanone, 4-decanone, cyclohexanone, 2-methylcyclohexanone and 2,5-dimethylcyclohexanone. However, of the various satisfactory ketones, a preferred group of compounds for use in the present invention comprises acteone, 2-butanone (methyl ethyl ketone), and 4-methyl-2-pentanone (methyl isobutyl ketone).

In carrying out the process of this invention the polyunsaturated, high molecular weight compound, either with or without the addition of a low molecular weight unsaturated compound, is brought into reactive engagement with the sulfur dioxide-ketone adduct. The normal procedure is to provide the unsaturated reactant(s) in solution form and to introduce that solution into the liquid adduct which serves as the coagulating bath. The introduced solution immediately reacts with the sulfur dioxide of the adduct to form an insoluble reaction product. When filaments or other continuous shapes are being produced, the solution of the rubber or other unsaturated reactant is continuously injected, or spun, into the adduct, preferably through a multi-perforated plate known as a spinnerette, and the resulting precipitated elements are continuously withdrawn from the coagulating bath, or adduct, for washing and/or other desired after-treatment. Formation of the precipitated reaction product need not be effected in this manner, however, for useful reaction products can also be produced by introducing the adduct into a solution of the unsaturated reactant, or by bringing the adduct into engagement with the unsaturated reactant even when the latter is in the solid state or is swollen due to the presence of absorbed solvents, e. g., benzene, dioxane, tri-cresyl phosphate, or acetone.

It also forms a feature of the present invention to employ as a coagulating bath a sulfur dioxide-ketone adduct of the type described above which contains from 1 to 5% by weight of water. The use of a water-containing adduct is particularly advantageous when spinning rubber solutions into threads, for though clogging of the spinnerette is apt to occur when an anhydrous adduct is used, surprisingly, this difficulty can be entirely avoided by introducing the small quantity of water noted above into the coagulating bath.

While the unsaturated reactants, as the polyunsaturated, high molecular weight compounds, can be directly reacted with the sulfur dioxide component of the adduct comprising the coagulating bath, it is preferable that said unsaturated reactants be first activated by treatment with a hydroperoxide, as decalin hydroperoxide, tetralin hydroperoxide, peracetic acid, perbenzoic acid, tert-butyl hydroperoxide, hydrogen peroxide, persulfuric acid, percarbonic acid or perboric acid, in accordance with the teachings of the aforesaid U. S. Patent No. 2,469,847 and copending application Serial No. 788,312. As described in said applications, the amount of activating agents to be used may be varied though a generally recomended addition is one amounting to approximately 15% by weight of the unsaturated reactant or reactants undergoing treatment. However, when the sulfur dioxide-ketone adducts here described are employed, the reaction with the previously activated unsaturated reactant(s) goes forward so quickly and with such completion that premature deactivation of the unsaturated reactant by the sulfur dioxide present does not occur. This makes possible the employment of smaller additions of such peroxide activating agents than would otherwise be necessary. Thus, by using a sulfur dioxide-acetone adduct containing substantially 50% by weight of sulfur dioxide, the amount of hydroperoxide employed, as tetralin hydroperoxide, may well be reduced by as much as 50%.

It is another feature of the present invention that by employing a lower aliphatic ketone with sulfur dioxide as the coagulating bath, the same (ketone) solvent may be used to dissolve the unsaturated reactant or reactants as to contain the sulfur dioxide. Under these conditions, injection of the unsaturated reactant does not alter the composition of the coagulating bath, though its sulfur dioxide content may be somewhat depleted. This presents several advantages, for by preserving the coagulating bath from adulteration it is possible to obtain a reaction product of the highest uniformity, and there is never any problem of separating the ketone from another solvent at the conclusion of a run. Instead, the liquid remaining in the coagulating bath can be readied for further use merely by recharging the same with sulfur dioxide if, indeed, any loss of this compound has not already been made up through direct sulfur dioxide addition as the reaction with the unsaturated component progresses.

The use of an adduct made up of acetone and sulfur dioxide as the coagulating bath has proven especially attractive when working with either natural or synthetic rubber, particularly the butadiene-derivative synthetics. This adduct, which is liquid within the desired reaction range of −10° to 20° C., suffers no appreciable loss of sulfur dioxide to the atmosphere in this temperature range and, moreover, is non-inflammable. The adduct is built up in the ratio of 1 mol of acetone to 1 mol of sulfur dioxide, and it consequently contains approximately 52.5% by weight of sulfur dioxide when in the anhydrous state. With 2% of water present, the bath still contains approximately 51.5% sulfur dioxide. This content of sulfur dioxide is, moreover, all available for reaction with any unsaturated component with which the adduct is brought into reactive engagement. Working, for example, with solutions of natural or synthetic rubber and an acetone-sulfur dioxide adduct maintained at 10° C., there are readily obtained filaments or other solid reaction products containing the maximum sulfur content of between 22 and 23%. If, on the other hand, the conventional ethanol or methanol solutions of sulfur dioxide are used as the coagulating medium for the rubber solution, it is possible to provide them with but from 18 to 20% by weight sulfur dioxide at approximately 10° C., if large volumes of sulfur dioxide are not to escape in vapor form. Such relatively dilute solutions as this seldom provide a sulfur content of more than 15% in the finished, rubber-sulfur dioxide reaction product even under the most favorable circumstances.

A given sulfur dioxide-ketone adduct, though supplying sulfur dioxide to the saturated reactant, is reduced in concentration but slowly, particularly when relatively large volumes of the adduct are employed. However, the sulfur dioxide concentration may, if desired, be maintained at any desired level by making constant or intermittent additions of fresh quantities of sulfur dioxide. Refreshing the coagulating bath in this manner does not interfere with the desired reaction between saturated component, or components, and the sulfur dioxide of the adduct.

The concentration of sulfur dioxide in the coagulating bath need not be so great as to unite with all portions of the ketone present. It is preferred that the overall sulfur dioxide concentration be at least 300 grams per liter of adduct. On the other hand, good results have also been obtained with adducts containing as little as 150 to 200 grams of sulfur dioxide per liter, particularly when the bath is maintained at 0° C. or below. While the cost of refrigeration is here a disadvantage, nevertheless the bath is substantially free of escaping sulfur dioxide vapors, and the reaction with the unsaturated reactant is both quicker and more complete than would be the case were conventional coagulant media to be employed.

The following examples illustrate the manner in which this invention finds preferred embodiment.

*Example I*

A 6.5% solution of natural rubber (plasticized, first latex crepe) in equal parts by volume of benzene and toluene was activated by the addition of 15% tetralin hydroperoxide, based on the weight of rubber present. The resulting solution was then spun into an acetone-sulfur dioxide coagulating bath maintained at 15° C. This bath, in turn, had been prepared by passing sulfur dioxide into a mixture of 97% by volume acetone and 3% by volume water until the liquid contained 500 grams sulfur dioxide per liter. The filaments obtained as a result of this spinning procedure, on being washed and dried, were found to have a sulfur content of 22.4% by weight. Further, they demonstrated good tensile strength and the other physical qualities desired in filaments to be employed as thread. Substantially no sulfur dioxide was evolved from the bath in vapor form during the spinning operation.

For the sake of comparison another operation was conducted under the identical conditions as described above, except that here an ethanol-water (4:1 by volume) solution saturated at 15° C. with sulfur dioxide was employed as the coagulating bath. In this case the resulting washed and dried filaments contained only 15% by weight sulfur.

*Example II*

The rubber solution of Example I, activated by tetralin hydroperoxide, were here spun into acetone (containing 3% water by volume) in which 180 grams of sulfur dioxide per liter had been dissolved, at −5° C. The filaments produced in this bath contained 21% by weight sulfur.

*Example III*

The rubber solution of Example I, activated with tetralin hydroperoxide, was here spun into a coagulating bath made up of 2-butanone, sulfur dioxide and water, said bath having been prepared by passing sulfur dioxide into 2-butanone (containing 3% water by volume) until the solution contained approximately 450 grams of sulfur dioxide per liter, at 10° C. The resulting filaments contained 22% by weight sulfur.

*Example IV*

The operation of Example I, the first paragraph, is repeated but using decalin hydroperoxide instead of tetralin hydroperoxide as the activating agent. The results are substantially identical with those described in said example.

*Example V*

A 6% solution of Perbunan synthetic rubber (butadiene-acrylonitrile co-polymer) in acetone is prepared and the same is activated through the addition of 10% tetralin hydroperoxide based on the weight of the synthetic rubber present. This solution is spun into an acetone-sulfur dioxide coagulating bath containing 500 grams of sulfur dioxide and 20 grams of water per liter, at 10° C. The resulting filaments, on being washed and dried, contain substantially 21% by weight sulfur.

*Example VI*

A 7% solution of butadiene polymer (molecular weight, approximately 50,000) in equal parts by volume of toluene and benzene is prepared, and to this solution is added 15% tetralin hydroperoxide based on the weight of polymer present.

This solution, on being spun into an acetone-sulfur dioxide adduct containing substantially 500 grams of sulfur dioxide, together with about 20 grams of water, per liter, at 10° C., readily precipitates in the form of strong filaments which, on being withdrawn from the bath, washed and dried, are found to contain approximately 22% by weight sulfur.

*Example VII*

The experiment of Example VI is repeated, except that in this case the butadiene polymer is dissolved in vinyl acetate, the latter compound being a low molecular weight unsaturated reactant as well as a solvent for the polymer compound. The resulting solvent is then activated by the addition of approximately 15% by weight tetralin hydroperoxide, based on the weight of the entire solution. The filaments produced by injecting this solution into an acetone-sulfur dioxide adduct, in addition to containing large amounts of sulfur, are characterized by the ready acceptance of a wide variety of dyestuffs.

I claim as my invention:

1. In a process wherein a solution containing a hydroperoxide and a rubbery polymer of at least one compound selected from the group consisting of the conjugated diolefins and chloroprene is injected into a coagulating bath containing available sulfur dioxide wherein the rubbery polymer reacts with the sulfur dioxide to form an insoluble filamentary reaction product which is then withdrawn from the bath, the improvement comprising providing a coagulating bath made up of an adduct of sulfur dioxide with a saturated aliphatic ketone containing between 3 and 10 carbon atoms, said bath containing from about 1 to 5% by weight of water and at least 150 grams of sulfur dioxide per liter of the bath solution.

2. The process of claim 1 wherein the ketone of the coagulating bath is selected from the group consisting of acetone, methyl ethyl ketone and methyl isobutyl ketone.

3. In a process wherein a solution containing a hydroperoxide and natural rubber is injected into a coagulating bath containing available sulfur dioxide wherein the rubber reacts with the sulfur dioxide to form an isoluble filamentary reaction product which is then withdrawn from the bath, the improvement comprising providing a coagulating bath made up of an adduct of sulfur dioxide with a saturated aliphatic ketone containing between 3 and 10 carbon atoms, said bath containing from about 1 to 5% by weight of water and at least 150 grams of sulfur dioxide per liter of the bath solution.

4. The process of claim 3 wherein the ketone of the coagulating bath is selected from the group consisting of acetone, methyl ethyl ketone and methyl isobutyl ketone.

5. In a process wherein a solution containing a hydroperoxide and a synthetic, rubbery butadiene polymer is injected into a coagulating bath containing available sulfur dioxide wherein the polymer reacts with the sulfur dioxide to form an insoluble filamentary reaction product which is then withdrawn from the bath, the improvement comprising providing a coagulating bath made up of an adduct of sulfur dioxide with a saturated aliphatic ketone containing between 3 and 10 carbon atoms, said bath containing from about 1 to 5% by weight of water and at least 150 grams of sulfur dioxide per liter of the bath solution.

6. The process of claim 5 wherein the ketone of the coagulating bath is selected from the group consisting of acetone, methyl ethyl ketone and methyl isobutyl ketone.

JOHANNES THOMAS HACKMANN.

REFERENCES CITED

The following references are of record in the file of this patent:

UNITED STATES PATENTS

| Number | Name | Date |
|---|---|---|
| 2,265,722 | De Nie | Dec. 9, 1941 |
| 2,288,982 | Waterman | July 7, 1942 |
| 2,379,354 | Hilton | June 26, 1945 |
| 2,469,847 | De Nie et al. | May 10, 1949 |